Aug. 18, 1936.　　　　G. H. LITTLE　　　　2,051,339
MACHINE FOR CLOSING CARTONS
Filed July 28, 1932　　　11 Sheets-Sheet 2

GEORGE H. LITTLE
Inventor

By Paul N. Eaton
Attorney

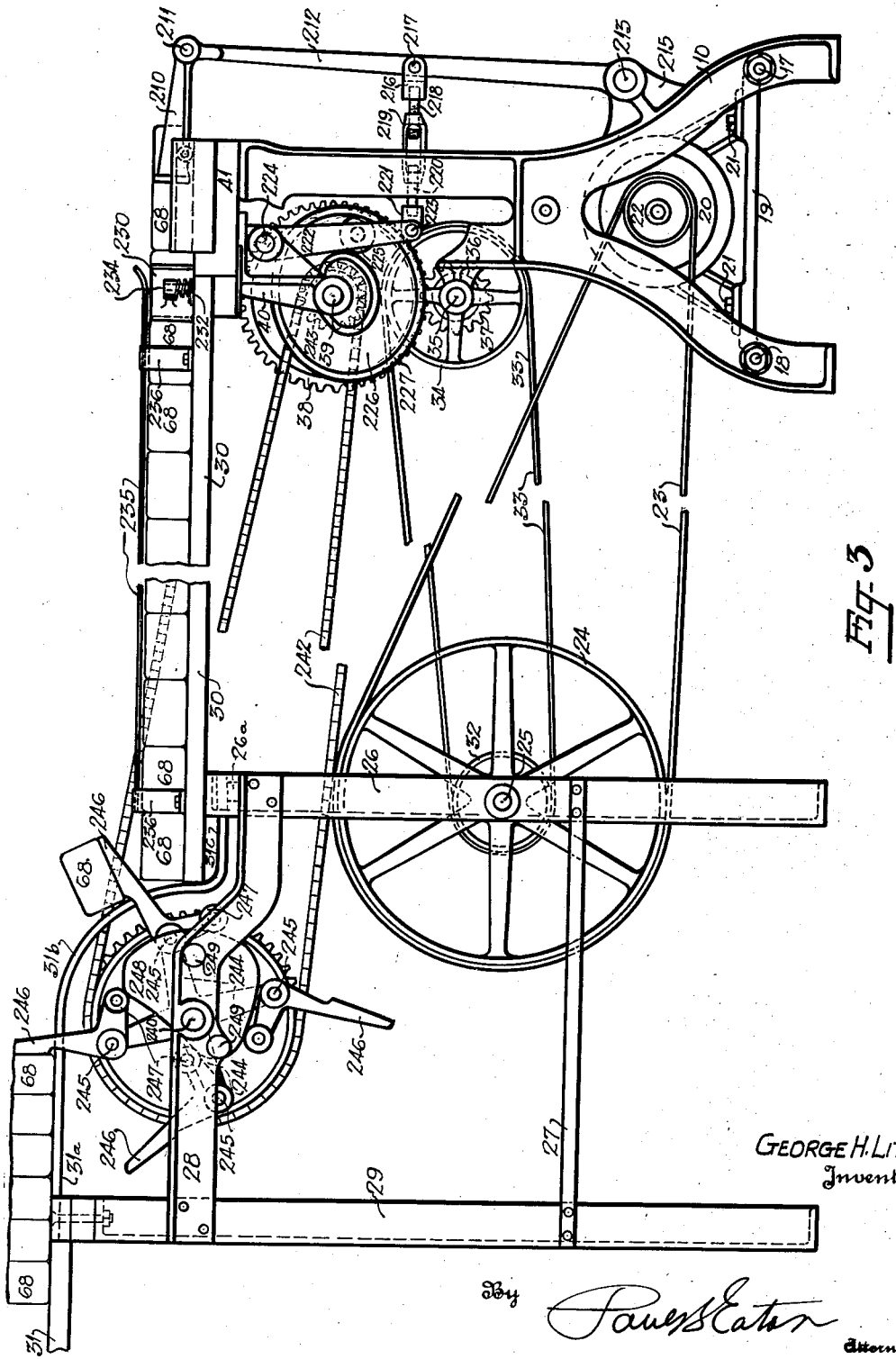

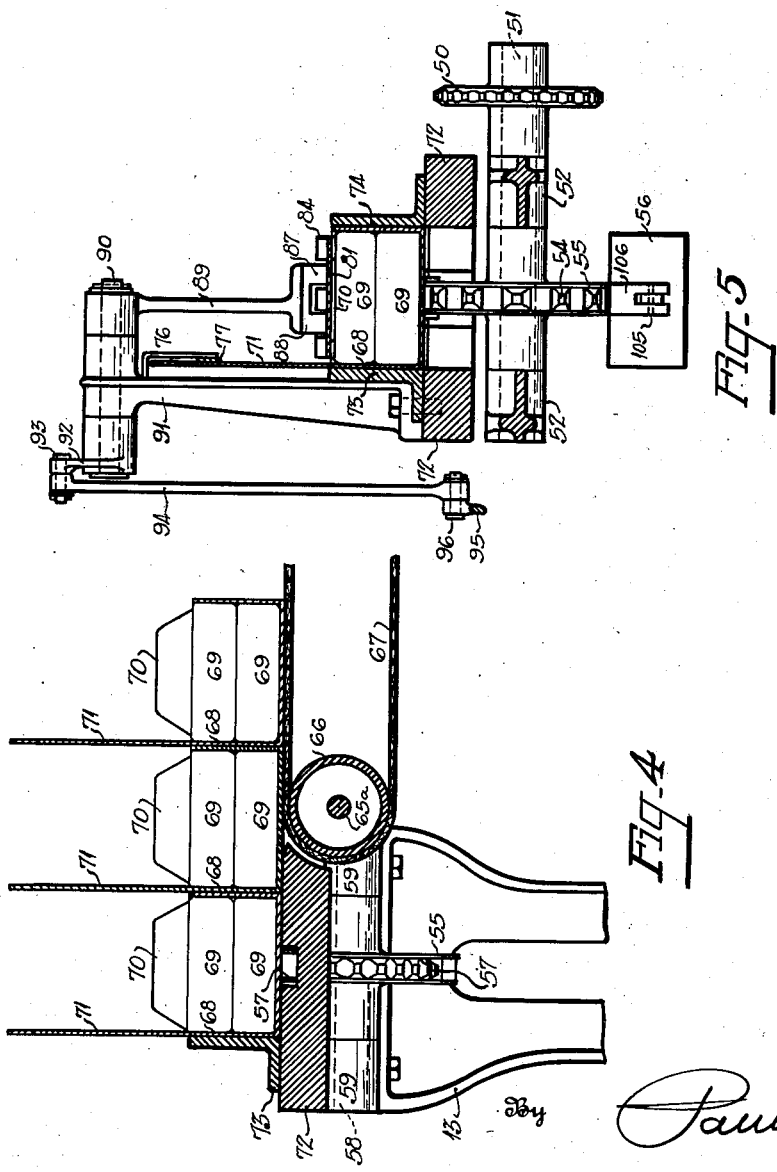

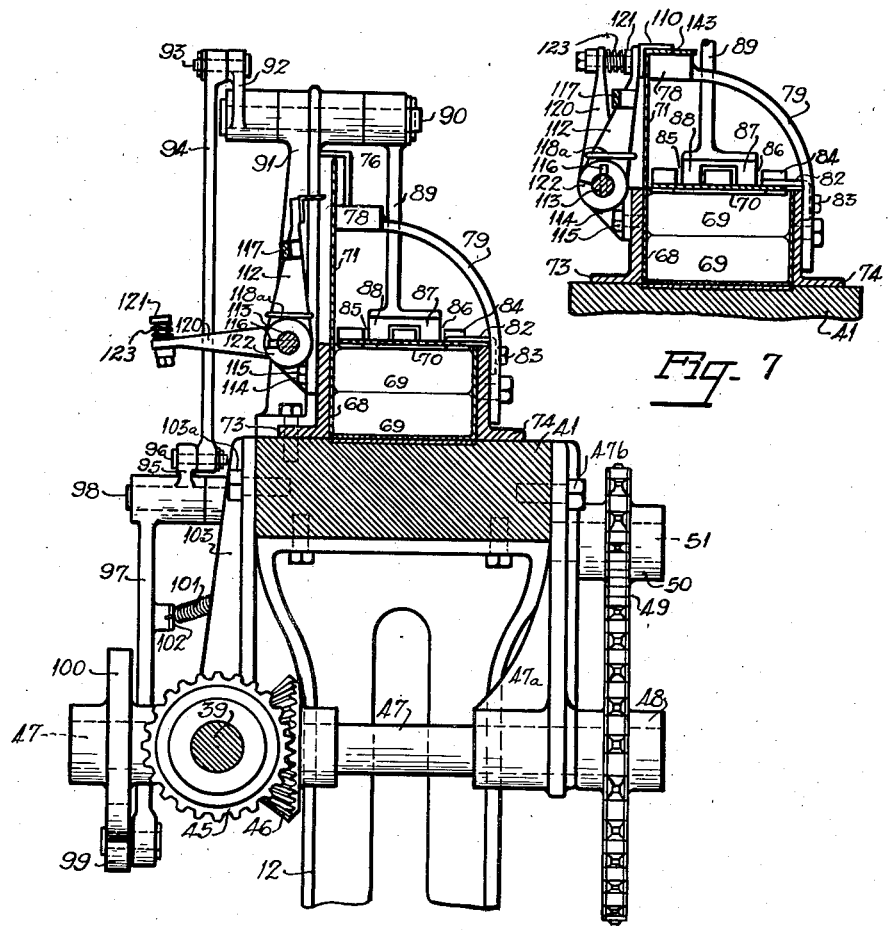

Aug. 18, 1936.  G. H. LITTLE  2,051,339
MACHINE FOR CLOSING CARTONS
Filed July 28, 1932    11 Sheets-Sheet 6
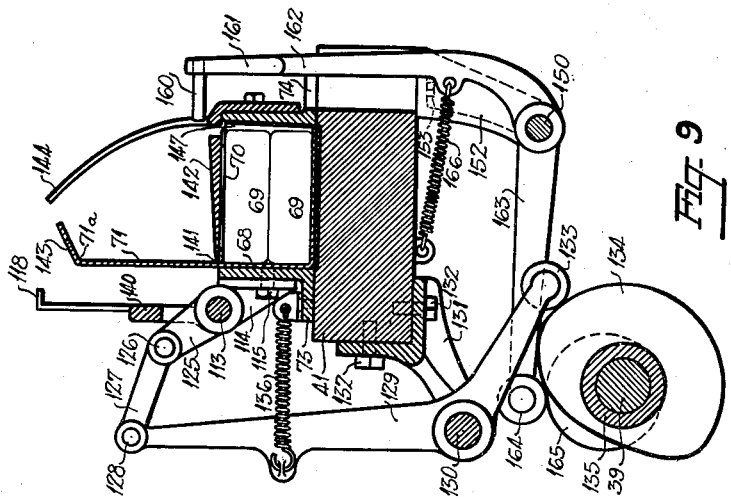
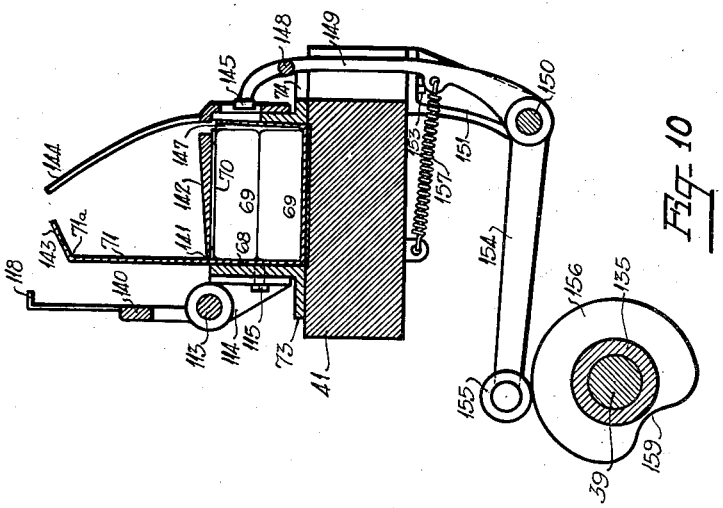
GEORGE H. LITTLE
Inventor
By Paul S. Eaton
Attorney Aug. 18, 1936.　　　　G. H. LITTLE　　　　2,051,339
MACHINE FOR CLOSING CARTONS
Filed July 28, 1932　　　11 Sheets-Sheet 7
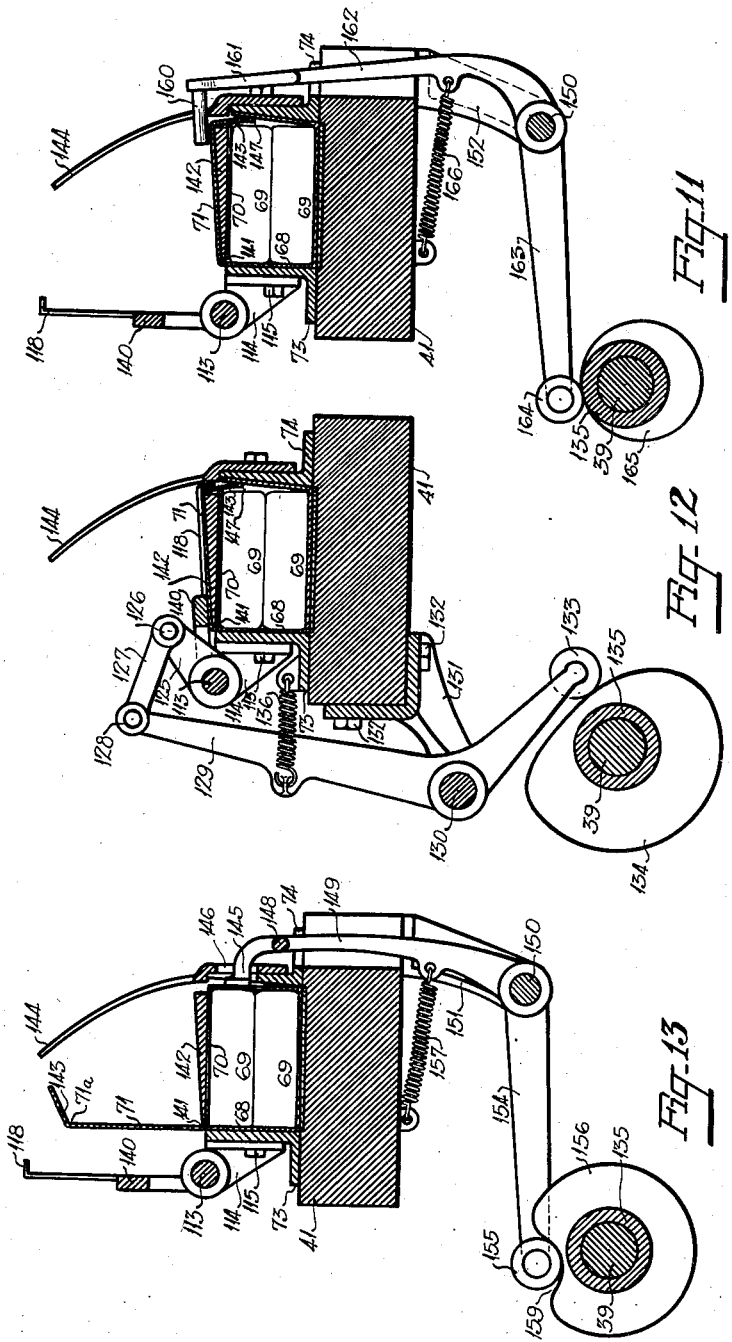
George H. Little
Inventor

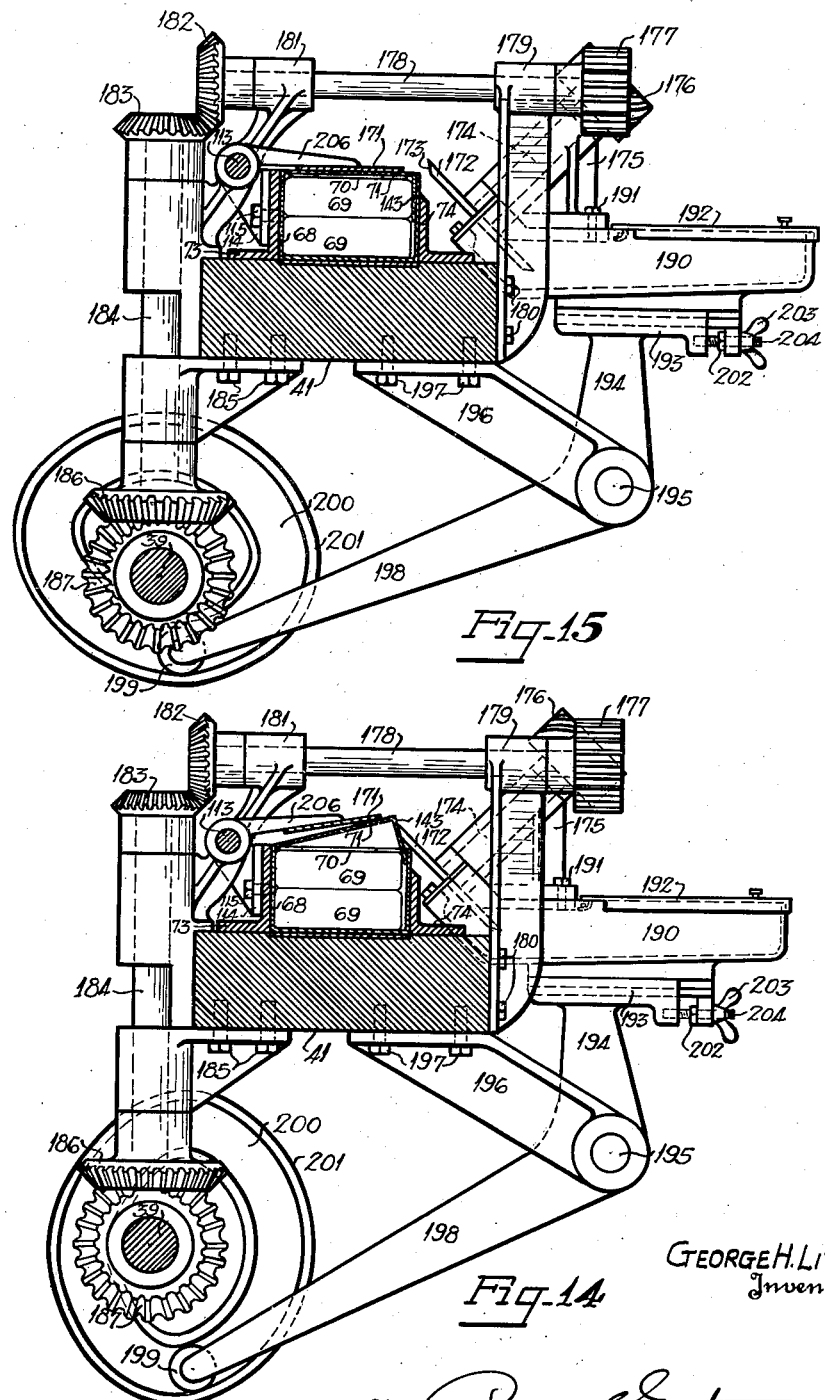

Aug. 18, 1936.   G. H. LITTLE   2,051,339
MACHINE FOR CLOSING CARTONS
Filed July 28, 1932   11 Sheets-Sheet 9
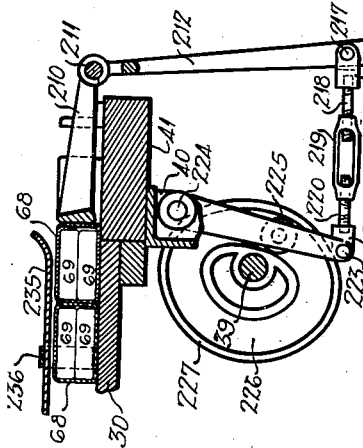
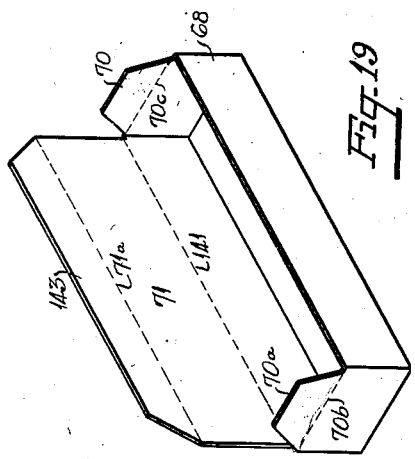
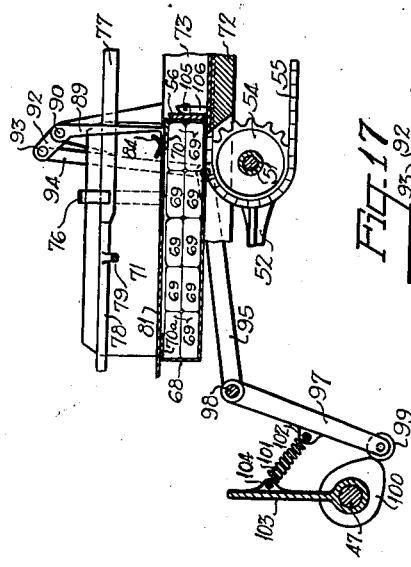
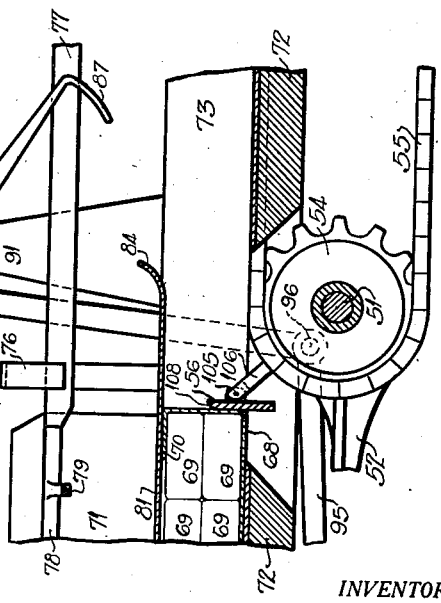
INVENTOR:
GEORGE H. LITTLE
BY Paul S. Eaton
ATTORNEY.

Aug. 18, 1936.　　　　G. H. LITTLE　　　　2,051,339
MACHINE FOR CLOSING CARTONS
Filed July 28, 1932　　　11 Sheets-Sheet 10
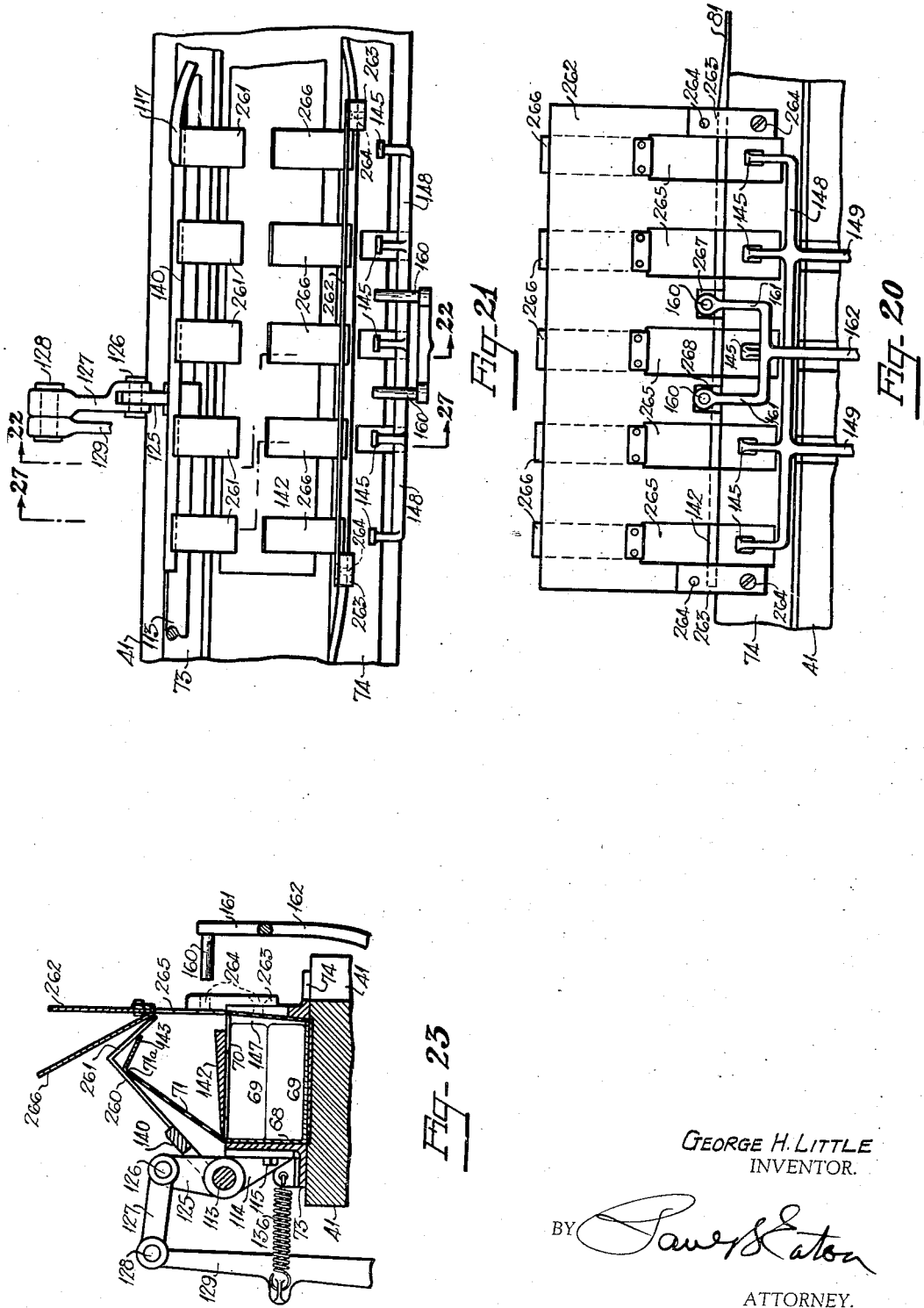
GEORGE H. LITTLE
INVENTOR.
BY 
ATTORNEY.

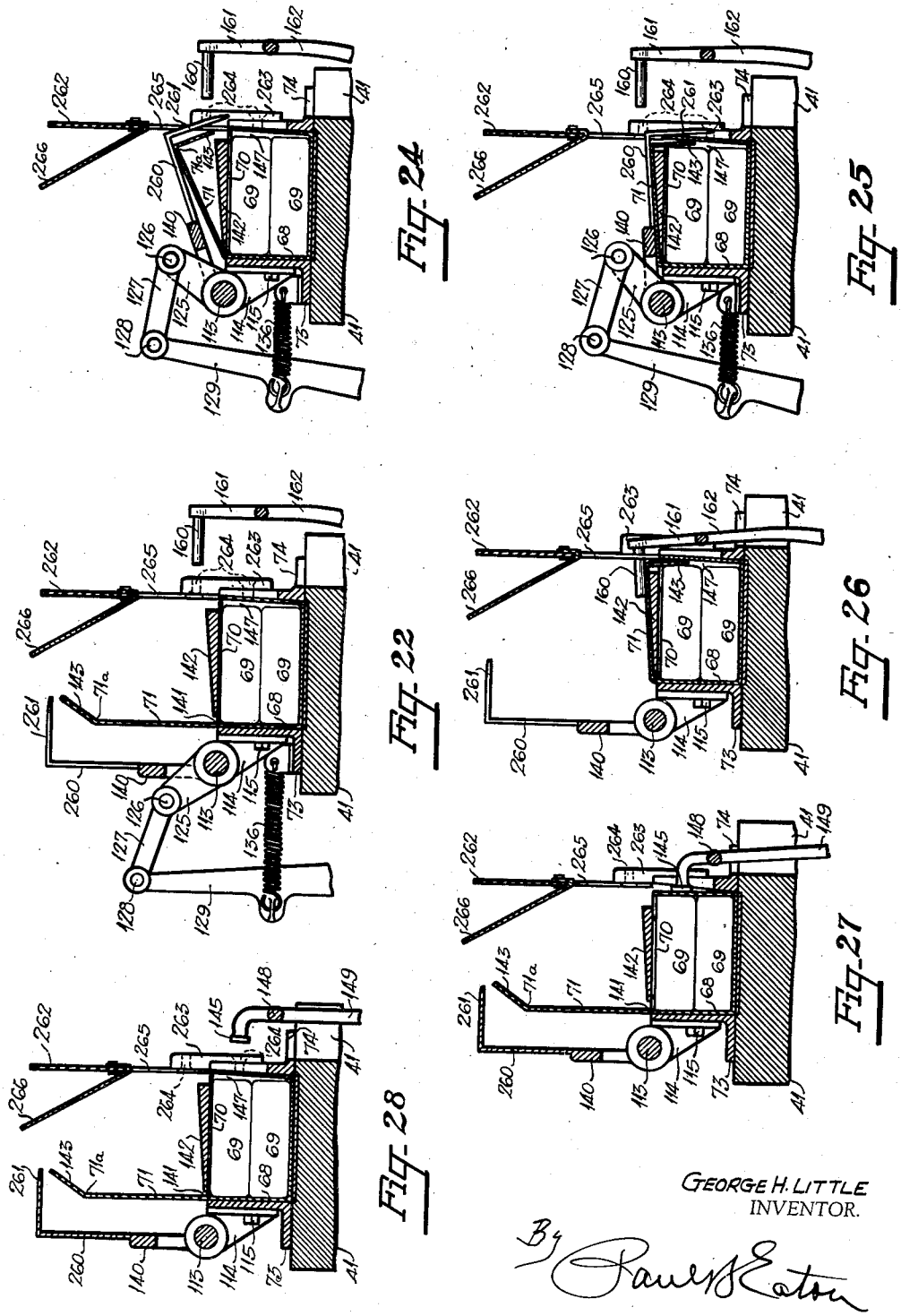

Patented Aug. 18, 1936

2,051,339

UNITED STATES PATENT OFFICE 2,051,339

MACHINE FOR CLOSING CARTONS

George H. Little, Winston-Salem, N. C., assignor to R. J. Reynolds Tobacco Company, Winston-Salem, N. C., a corporation of New Jersey Application July 28, 1932, Serial No. 625,284

34 Claims. (Cl. 93—6)

This invention relates to a carton folding and closing machine whereby the carton, having its lid portion integral with one of its sidewall portions, has its lid portion properly creased and moved to closed position, while the carton is traveling thru the machine.

The invention relates more specifically to a machine for folding and closing the lid portion of a new type cigarette carton, said machine having means for bending or creasing the lid portion at two different points; said machine also being provided with means for moving the lid of the carton to partially closed position and having means for holding the lid portion in partly closed position and means for applying an adhesive to the end portion of the lid while in partly closed position, and thereafter other means moves the lid to completely close the carton and other means are employed for applying pressure to the carton to cause the adhesive to set. Means are also provided for moving the carton in its sealed condition thru a chute, in which chute the cartons are forced one by the other so that by the time the cartons emerge from the chute the adhesive has dried and the filled cartons are ready for packing in suitable shipping containers.

The invention also relates to a machine for closing a carton filled with cigarettes with said carton having tongues projecting from the end portion and having a lid portion integral with one of the sidewall portions. The machine is equipped with means for creasing and folding the tongues on the end portions and also creasing and folding the lid member to closed position. Means are also provided for sealing the carton in closed position, all of said operations being carried out successively on the cartons as they are being moved thru the machine end to end.

Some of the objects of the invention having been stated, other objects will appear as the description proceeds when taken in connection with the accompanying drawings, in which—

Figure 3 is an end elevation of the machine with parts broken away, looking from the left hand end of Figure 2;

Figure 4 is a transverse sectional view thru the upper portion of the machine along line 4—4 in Figure 1;

Figure 5 is a vertical sectional view taken along line 5—5 in Figure 2;

Figure 6 is a vertical sectional view taken along line 6—6 in Figure 2;

Figure 7 is another view of parts of creasing mechanism shown in Figure 6 in another position;

Figure 8 is an elevation of the rear portion of the creasing mechanism shown in Figure 6 showing its relation to the folding mechanism and taken approximately along line 8—8 in Figure 6;

Figure 9 is a vertical sectional view taken along line 9—9 in Figure 2 showing the folding mechanism and also the holding device for maintaining the top of the carton in place after the folding operation has been completed;

Figure 10 is a vertical sectional view taken along line 10—10 in Figure 2 with parts omitted and showing the package evener fingers and their associated parts;

Figure 11 is a vertical sectional view taken at the same point as Figure 9 showing the holding device and its associated parts in another position from that shown in Figure 9;

Figure 12 is a vertical sectional view taken at same point as Figure 9 with parts omitted and showing the folding device and its associated parts in another position;

Figure 13 is a vertical sectional view taken at same point as Figure 10 and showing the package evener fingers and their associated parts in another position;

Figure 14 is a vertical sectional view taken along line 14—14 in Figure 2 showing the pasting mechanism and the final closing means;

Figure 15 is another vertical sectional view taken along the same line as Figure 14 but showing the pasting mechanism and final closing means in advanced position from that shown in Figure 14;

Figure 16 is a vertical sectional view taken along the line 16—16 in Figure 1 showing carton remover and the mechanism associated therewith with cartons added;

Figure 17 is a longitudinal sectional view taken along line 7—7 in Figure 1 with parts omitted showing the mechanism for creasing the end projections of the carton.

Figure 18 is a longitudinal sectional view taken at the same place as Figure 17 but showing the carton removed to another position;

Figure 19 is an isometric view of a type of carton adapted for use in the machine.

Figure 20 is an elevation of a modified form of that portion of the machine indicated by A in Figure 1;

Figure 21 is a top plan view of the modified form of the structure for section A in Figure 1;

Figure 22 is a transverse sectional view taken along the line 22—22 in Figure 21;

Figure 23 is a view similar to Figure 22 but showing the closing means moved to approximately half way closed position;

Figure 24 is a view similar to Figure 22 but showing the lid moving further toward closing position;

Figure 25 is a view similar to Figure 22 but showing the parts moved to approximately their furthest advanced position;

Figure 26 is a view similar to Figure 25 but showing the holding fingers 160 moved to holding position with certain parts omitted;

Figure 27 is a transverse sectional view taken along the line 27—27 in Figure 21;

Figure 28 is a view similar to Figure 27 showing the parts slightly advanced from that in Figure 27;

Figure 29 is an elevation of a portion of the right hand end of the machine as shown in Figure 1 showing the guide strip which keeps the lid of the carton in an upright position.

Figure 1:
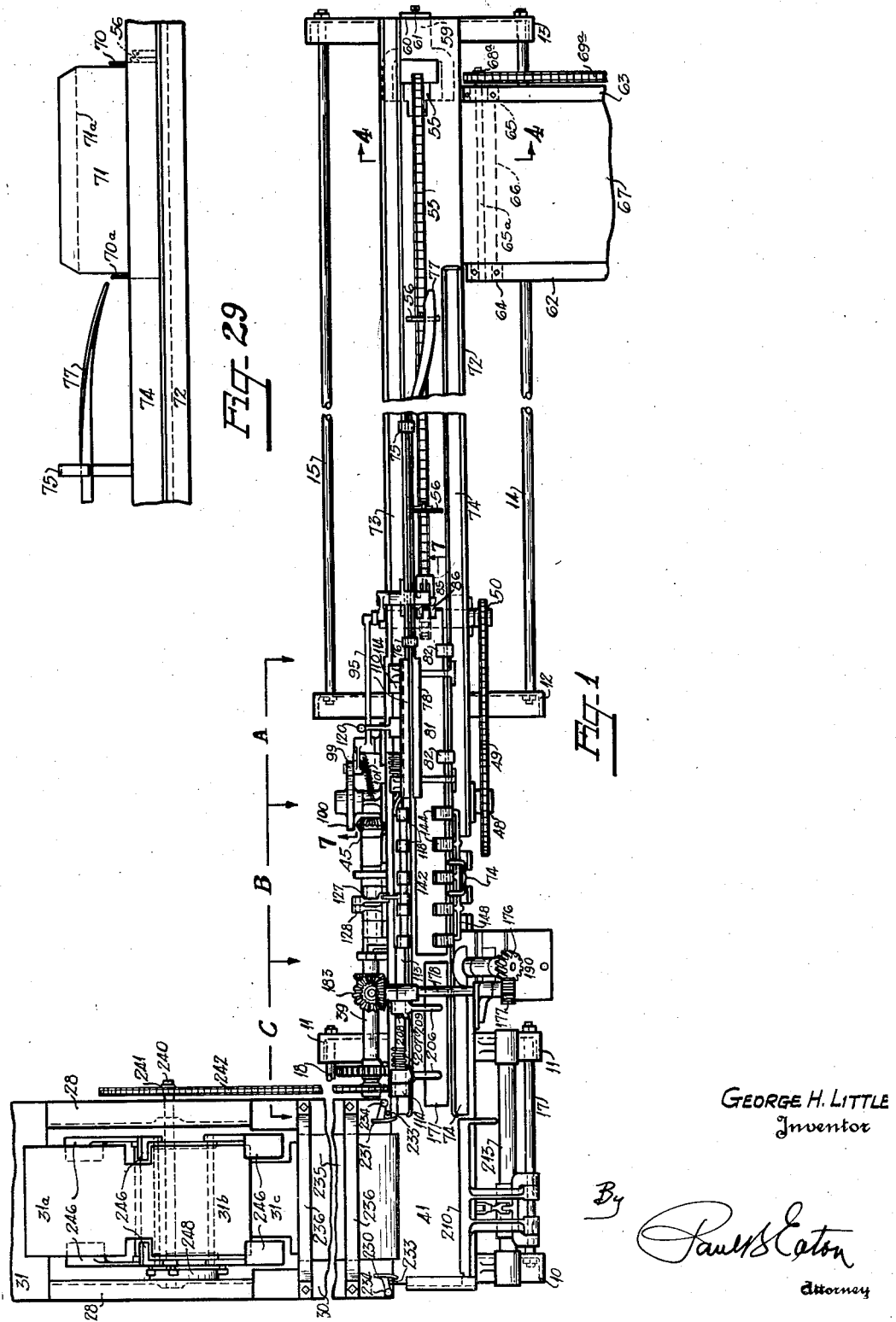
Figure 1 is a plan view of the carton folding machine.
Figure 2:
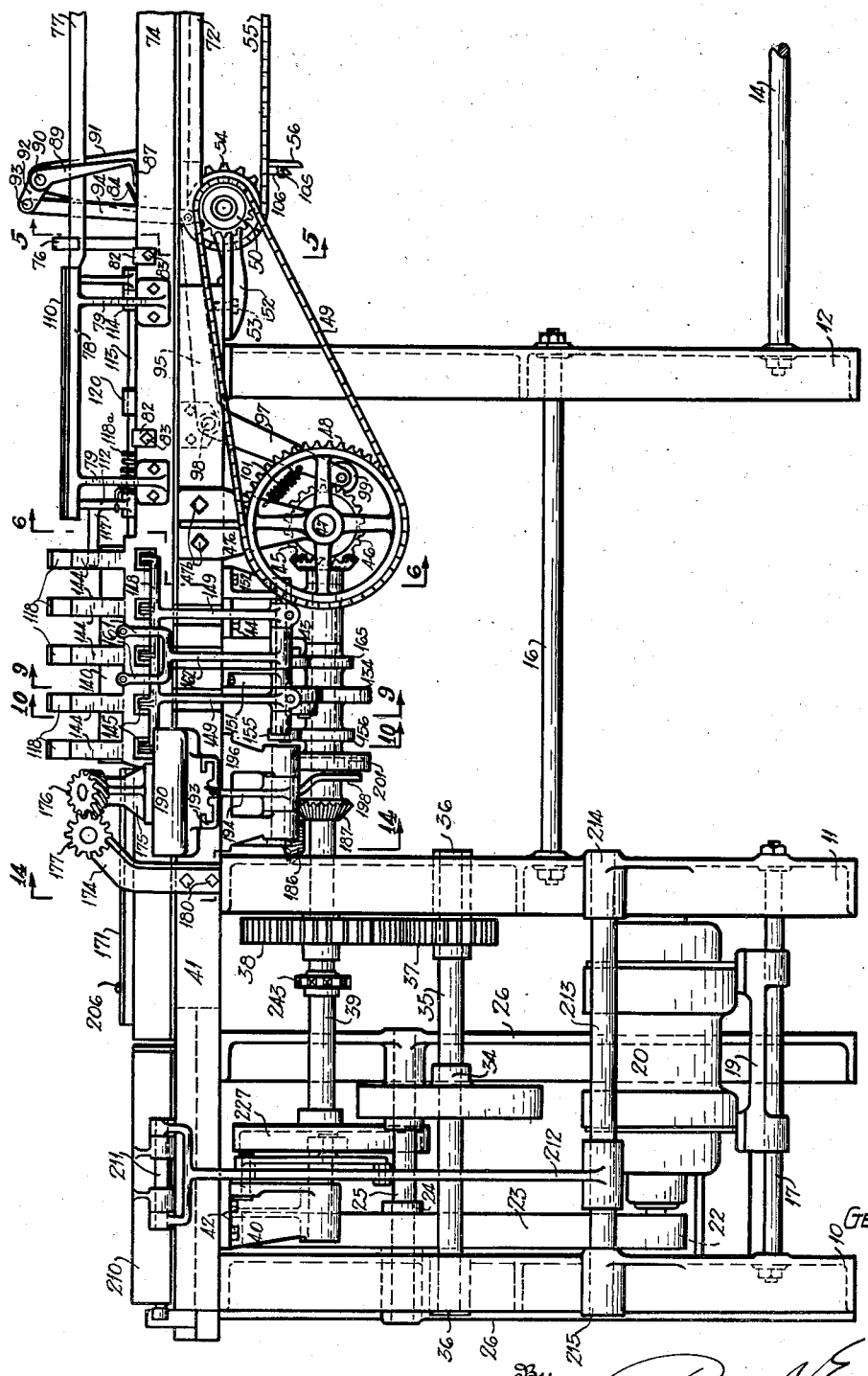
Figure 2 is an elevation of the left-hand portion of Figure 1.

Referring more particularly to the drawings, the numerals 10, 11, 12 and 13 denote vertical supports for the carton folding machine which have suitable horizontal braces or rods 14, 15, 16, 17 and 18 for holding these supports in position at their lower ends. Each support 11, 12 and 13 is similar to support 10 as seen in Figure 3. Mounted on horizontal rods 17 and 18 is a base member 19 which supports motor 20 and is secured thereto by any suitable means such as stud bolts 21. A suitable pulley 22 is mounted on motor 20 which is adapted to drive a still larger pulley 24 by any suitable driving means such as belt 23. This pulley 24 is fixedly mounted on rotatable shaft 25 supported at its ends by bearings in vertical members 26. The upper ends of members 26 are secured to vertical members 29 by means of horizontal members 28 and straps 27 also secure said members 26 to vertical members 29 (Figs. 1, 2 and 3). Mounted on supports 26 and on table member 41 supported by supports 10, 11, and 12, is a table 30 serving as a slide for cartons and the like after the same have been closed. Mounted on supports 29 is a table 31 which is adapted to receive the sealed cartons. Table 31 is slightly elevated above table or slide 30. Extending from table 31 is an apron having a horizontal portion 31a, an arcuate portion 31b and a second horizontal portion 31c secured to a suitable cross member 26a disposed between supports 26.

Upon rotatable shaft 25 is fixedly mounted a small pulley 32 which is adapted by means of a suitable belt 33 to drive a still larger pulley 34, fixed on shaft 35 rotatably mounted in bearings 36 of members 10 and 11. Fixed on said shaft 35 is a gear or pinion 37 which is adapted to mesh with a larger gear or pinion 38 to drive main drive shaft 39.

It is to be noted that the sizes and arrangement of the various pulleys are such that the revolutions per minute of the main shaft 39 have been reduced to a very much smaller number than that of the main drive shaft of the motor.

Shaft 39 is supported at one end by means of a suitable bearing 40 which is attached to table member 41 by any suitable means such as bolts 42 and at the other end of shaft 39 is bearing 43 which also is attached to bottom portion of table member 41 by any suitable means such as stud bolt 44. On the right hand end of shaft 39, Figure 2, is mounted a bevel gear 45 which is adapted to mesh with another bevel gear 46 mounted on transversely disposed shaft 47.

On one end of shaft 47 is mounted a sprocket chain 49, said sprocket chain being mounted on smaller sprocket 50 to drive shaft 51. Shaft 51 is mounted in forked bearing member 52 (Figs. 2 and 5) which is attached to the lower portion of table member 41 by any suitable means such as stud bolts 53.

Shaft 47 is mounted in bearings 103 and 47a, said bearings extending upwardly and are fastened to sides of table member 41 by any suitable means such as stud bolts 103a and 47b respectively.

Near the center portion of shaft 51 is fixedly mounted another sprocket 54 and this sprocket has chain 55 mounted thereon, said chain having lugs 56 which are adapted to engage the cartons and force them into the machine. The other end of chain 55 is mounted on sprocket 57 (Figs. 1 and 4) which in turn is mounted on shaft 58 supported by forked bearing member 59 which is slidably mounted on top of supporting member 13 and has downturned portion 60 and also stud bolt 61. It is evident that by turning stud bolt 61 adjustment can be obtained and the chain 55 can be tightened to any desired amount.

Secured to the lower portion of beam members 62 and 63 of the conventional delivery mechanism for delivering the filled cartons to the folding machine, are bearings 64 and 65 having mounted therein a shaft 65a with a roller 66 secured thereon which drives conventional conveyer belt 67. Upon one end of shaft 65 is mounted sprocket wheel 68a which in turn has mounted thereon a sprocket chain 69a driven by any suitable source of power not shown. On conveyor 67 is shown a plurality of cartons 68 containing a number of smaller packages 69. Though it is evident cartons 68 may contain any suitable packages or material, this machine is peculiarly designed for creasing and closing and sealing a carton containing packages of cigarettes.

Each of these cartons as shown is closed on all sides except the top and has two projections 70 and 70a integral with the ends and also the side projection 71, integral with one side of the carton. Each of said projections will be creased in a manner and by mechanism to be later described.

It is evident that as roller 66 turns in a counter clockwise direction in Figure 4, cartons 68 are forced upon table member 72 and between guide angles 73 and 74 by means of lugs 56 on chain 55. Table 72 has its upper surface in the same plane as table or slide 41 and is supported at one end on support 13 and at its other end by being suitably secured to slide 41. From this position cartons 68 are carried by means of chain 55 and lugs 56 between guide angles 73 and 74 to a position as shown in Figure 17. Suitable supports such as straps 75 and 76 (Figs. 1 and 17) are secured to guide angles 73 at their lower ends and project upwardly laterally and downwardly and have secured at the rear side of the downwardly projecting portion a horizontally disposed guide strip 77.

Guide strip 77 at its right hand end in Figure 1 is flared outwardly and downwardly over the path of the cartons in order to allow projection 71 of carton 68 to be guided by strip 77 in an upright position. The left hand end of strip 77 as seen in Figures 1 and 2 abuts against creasing bar 78 which has integral therewith curved supports 79 which project downwardly and are secured to guide angles 74 by any suitable means such as stud bolts 80.

A horizontally disposed plate 81, rectangular in cross section, is secured to the side of guide angle 74 by any suitable means such as straps 82 and stud bolts 83, (Figs. 1, 2, 17 and 18). At the right hand end of plate 81, as shown in Figure 1, the end portion 84 is curved upwardly. This is done in order to allow the end projection 70a of carton 68 to be engaged by this upturned projection and forced to occupy a horizontal position to crease the same. This upturned portion 84 has longitudinally disposed slots 85 and 86 therein thru which prongs 87 and 88 pass when creasing member 89, bearing these prongs, oscillates to crease the other projection 70 of carton 68 as shown in Figure 17. The creasing of end projections 70a and 70 is done while the carton is moving thru the apparatus.

Creasing member 89 is fixedly mounted at its upper end on a shaft 90 which is rotatably mounted in the upper end of bearing member 91, which bearing member is supported by slide or table 41 and is secured thereto by any suitable means such as stud bolts 91a. Shaft 90 has fixedly secured on the other end thereof lug 92. Pivotally secured to lug member 92 as at 93 is a link 94 which is pivotally secured at its other end to lever arm 95 as at 96. Member 95 has integral therewith another arm 97 and both arms 95 and 97 are pivoted on pin 98 which is secured to table member 41, (Figures 1, 2, 17 and 18).

On the lower end of arm 97 is mounted roller 99 which is adapted to engage cam 100 mounted on the end of shaft 47 and said roller is held in close proximity to cam 100 by means of tension spring 101 which is secured to arm 97 as at 102 and to bearing 103 as at 104. The roller 99 is so situated on cam 100 as to cause member 89 to be in the act of creasing projection 70 of carton 68, just before the end of projection 70 comes in contact with upturned portion 84 of plate 81.

As cam 100 rotates in the position shown in Figure 17, roller 99 which is normally held against cam 100 by means of spring 101 and arm 97 are forced to the right and the free end of arm 95 and also link 94 are therefore forced upwardly which in turn forces member 89 to the left in order to crease the projecting member 70 of carton 68 and cause the free end of projection 70 to be guided beneath upturned lip 84.

In Figure 18 carton 68 is shown in the position somewhat farther to the left after the projections 70 and 70a have been creased by the corresponding mechanisms comprising prongs 87 and 88 and lip 84.

It is to be noted that each lug member 56 when it reaches the position shown in Figure 18, on account of its being pivoted as at 105 to member 106 which is attached to chain 55 and on account of lug member 56 having a bevel surface on the upper end thereof, prevents the carton from being mutilated as it is moved to the left in Figure 18 as chain 55 moves on sprocket 54 as might happen in case this lug should not be beveled on the upper end and pivoted as at 105.

Creasing angle 110 (Figs. 1 and 6) is secured to arms 111 and 112 which are loosely mounted on shaft 113, said shaft 113 being mounted for oscillation in brackets 114 which are secured to guide angle 73 by any suitable means such as stud bolts 115. Arm 112 has a lateral projection 117 which is adapted to rest against one of creasing arms 118 to be later described, when the creasing arms are in raised position. A torsion spring 118a is wound around shaft 113 and has one end secured to guide angle 73 and the other end is secured to member 112. This spring has a tendency to push members 111 and 112 together with creasing angle 110 to the right and against the projection or lid 71 of carton 68 in Figure 6.

Fixedly secured on shaft 113 between members 111 and 112 is the driving arm 120 with a bolt 121 in the free end thereof having a compression spring 123 mounted thereon. This spring serves to lessen the impact imparted to creasing angle 110 when shaft 113 oscillates to cause bolt 120 to tap the back of creasing angle 110 as shown in Figure 7.

Member 112 also has a projection 122 which is adapted to be engaged by pin 116 mounted in shaft 113 to force creasing angle 110 out of the path of projection 71 of the carton as shown in Figure 6. Said members 111 and 112 are turnably mounted on shaft 113 and normally assume a position as shown in Figure 7 until pin 116 engages projection 122 and forces these members backwardly as in Figure 6, whereas, arm 120 is fixedly mounted on shaft 113 and is oscillated by the shaft.

Shaft 113 is oscillated by having fixedly mounted thereon a projecting lug 125 (Fig. 9) which has pivoted in the upper end thereof as at 126 a link 127, said link 127 being pivoted as at 128 to the upper portion of L-shaped lever 129. Lever 129 is pivoted on a shaft or pin 130 which is mounted in forked bearing 131 which in turn is secured to table member 41 by any suitable means such as stud bolts 132. The lower end of L-shaped member 129 has a roller 133 mounted thereon which is adapted to engage cam 134, which is integral with cam sleeve 135 fixedly mounted on main drive shaft 39. A suitable spring 136 is attached to angle guide 73 and also to the upper portion of L-shaped lever 129 which normally holds the roller 133 on lower portion of lever 129 against cam 134.

In Figure 12 the cam 134 for oscillating shaft 113 is shown in another position and in this position the shaft 113 will be turned clockwise to cause the creasing device to assume a position as shown in Figure 7.

Mounted on shaft 113 is a horizontal bar 140 which has attached thereto a plurality of creasing arms 118 angular in shape which are adapted to oscillate with shaft 113 being fixed thereon. The same movement of shaft 113 that causes creasing angle 110 to crease the top portion 143 of projection 71 of carton 68 along the line 71a also causes creasing fingers 118 mounted on bar 140 to simultaneously bend projection 71 along line 141 in Figure 19 to cause it to assume a position as shown in Figure 12.

The projection 71 which is now bent along the two lines 71a and 141 is held against triangular plate 142 which is integral with rectangular plate 81.

Suitable guide bars 144 are spaced at intervals opposite creasing arms 118 to guide portion 143 of projection 71 on the carton to cause this portion to come within the inside of the groove 147. Before this last described creasing operation is effected a plurality of evener fingers 145 are adapted to project thru holes 146 in angle guide 74 and engage the outside portion of a carton 68 to press against the carton and even up the smaller packages 69. When this operation takes place as shown in Figure 13 and the evener fingers have withdrawn, it will be noted that an opening 147 between the cigarettes or smaller packages and the sidewall of the carton will be formed. The opening 147 is formed because the inherent resiliency of the carton material tends to make it spread or bulge. This tendency is enhanced by the pushing forth of the oncoming carton and is further enhanced by the resistance offered by the friction between the walls of the chute to the cartons which have already passed the point where the sidewall of angle 74 is beveled. This opening 147 will make room for the portion 143 of projection 71 when this projection is creased in the position shown in Figure 12.

Evener fingers 145 have integral therewith a horizontal bar 148 which holds these fingers together and said bar member 148 has downwardly projecting members 149 which are fixedly mounted on shaft 150. Shaft 150 is mounted in bearings 151 and 152 and in turn these bearings are attached to the bottom portion of table member 41 by means of suitable stud bolts 153. Also secured to shaft 150 is horizontally projecting bar 154 (Fig. 10) which has on the free end thereof cam roller 155 adapted to contact cam 156 mounted on cam sleeve 135 on shaft 39. A suitable spring 157 is connected to an arm member 149 and also to the bottom portion of table member 41 to normally hold arm 154 down and to keep cam roller 155 in contact with cam 156. It should be noted that cam 156 is so made that when it is revolved and the cam roller engages notch portion 159 that a slight tapping effect will be produced by evener fingers 145 on one side of carton 68. Since this operation precedes the creasing operation which takes place due to fingers 118 and guides 144, the evener fingers must be out of the path of portion 143 before the fingers 118 are in position as shown in Figure 12. The vertical leg on guide angle 74 is beveled on its surface disposed next to the carton at this point in order to allow the front portion of carton 68 to rest against this surface in order to form a groove 147 between packages 69 and inside face of the carton into which portion 143 or carton lid is adapted to be inserted.

Immediately following the creasing operation shown in Figure 12, a holding device assumes the position shown in Figure 11. This holding device has pins 160 which are adapted to project inwardly and hold the projection 71 firmly against triangularly cross sectioned plate 142 and to also hold portion 143 in slot 147 slightly above the closed position in order that the gluing operation may take place which will be presently described.

This holding device has pins 160 attached in any suitable manner to fork members 161 which have integral therewith a downwardly projecting member 162. This downwardly projecting member 162 is turnably mounted on shaft 150 and has integral therewith another arm 163 which projects horizontally to the left as shown in Figure 11 and has on the left end thereof a cam roller 164 which is adapted to engage cam 165 mounted on cam sleeve 135 mounted on shaft 39. In Figure 9 this same mechanism is shown with the cam 165 turned to a slightly different position to show pins 160 in inoperative position. A suitable spring 166 is attached to downwardly projecting member 162 and also to bottom portion of table member 41 to normally hold cam roller 164 against the surface of cam 165.

When this last creasing step, just described, has taken place the carton 68 is forced out from beneath pins 160 and beneath the final closing device 171 which holds the projection 71 and portion 143 in a position shown in Figure 14. A circular disk 172 has beveled edge 173 and is adapted to contact portion 143 of projection 71 and a suitable adhesive is applied to this portion of the carton. This disk 172 is adapted to rotate upon shaft 174 which is mounted in a suitable bearing 175 and has on the other end thereof a gear or pinion 176 which is adapted to engage the gear 177 mounted on shaft 178, said shaft 178 being mounted in bearing 179 which projects downwardly and is fastened to the side portions of table member 41 by any suitable means such as stud bolts 180. It should be noted that the gear teeth in pinion 177 are parallel to the axis of shaft 178, whereas, gear teeth in pinion 176 are angularly disposed but these gears mesh so that the bearing 175, together with the glue pot 190 can maintain another position to the right as shown in Figure 15; that is, the slight variation in position of pinion 176 to the right or left as might be caused by the action of cam 201 presently to be described, will not materially affect the operation of the gears.

The other end of shaft 178 is mounted in bearing 181 and has on the end thereof a bevel gear 182 which is adapted to mesh with another bevel gear 183. This gear 183 is mounted on vertically disposed shaft 184 which in turn is mounted on the lower portion of bearing 181. Said bearing 181 is secured to lower portion of table member 41 by any suitable means such as stud bolts 185. On the lower portion of shaft 184 is another bevel gear 186 which is adapted to mesh with bevel gear 187 mounted on main drive shaft 39.

It is seen from Figure 14 that as shaft 39 revolves, the movement is transmitted thru shaft 184, beveled gears 182 and 183 and shaft 178 to cause gear 177 to turn gear 176 and to cause the desired rotation to take place in disk 172 to apply adhesive to the portion 143 of carton 68. Bearing 175 which has mounted therein shaft 174 for producing the rotation for the gluing operation is mounted on glue pot 190 by any suitable means such as stud bolts 191.

Glue pot 190 is adjustably mounted on portion 193 which has vertically disposed member 194 integral therewith, said member 194 being mounted on pin 195. Pin 195 is mounted in forked bearing 196, said bearing being secured to the bottom portion of table member 41 by any suitable means such as stud bolts 197.

The lower portion of wheel 172 is always in contact with the glue or adhesive in glue pot 199 and this causes the adhesive to be applied along the portion 143 as the carton is moved past wheel 172 by the next succeeding carton moving in a position to have its lid moved to partially closed position.

Vertically disposed member 194 has integral therewith inclined or angularly disposed member or arm 198 which has on the other end thereof a cam roller 199 which is adapted to travel in groove 200 of double acting cam 201, said cam 201 being fixedly mounted on cam sleeve 135 mounted on shaft 39.

It should be noted that by turning nut 202 and wing nut 203 mounted on bolt 204 in Figure 14 that any desired adjustment can be made on the glue pot in a horizontal lateral direction. Sufficient portions from the top of guide angle 74 and table member 41 are cut away in order to secure the proper clearance for circular disk 172 when it moves to the left in Figure 14 to apply adhesive to projection 143.

Figure 15 shows the position of the gluing apparatus after the carton 68 has passed the disk 172. After the carton passes the disk 172 immediately before the final closing device or rectangular blade closes down upon portion 71 and forces portion 143 down into the carton to finally close the package. Closing plate 171 is secured to members 206 which members are loosely mounted on shaft 113. Spring 207 mounted on shaft 113 normally holds members 206 and plate 171 in the position shown in Figure 14. A pin 208 mounted in shaft 113 is adapted to engage a projection on member 206 (Fig. 1) and cause the closing device to assume the position as shown in Figure 15.

The function of projection 209, pin 208 associated with spring 207, is identical to that of spring 118a and projection 122, together with pin 115 in Figure 8. In the final closing operation, however, the spring normally tends to hold the creasing device open and the pin when it engages projection 209 causes the closing device to operate, whereas, in Figure 8 the spring has a tendency to cause the angle portion 110 to close and the pin 116 when it engages projection 122 serves to open this member. After a carton 68 has been finally closed it is forced by the other cartons to the extreme left hand end of the machine as shown in Figure 1, while package remover 210 is adapted to engage said package to push it to the left in Figure 3.

Package remover 210 is pivoted at its right hand end in Figure 3 as at 211 to the upper portion of arm 212 which is secured at its lower end to shaft 213 mounted in bearings 214 and 215 which project out from supporting members 11 and 10 respectively. Between shaft 213 and point 211 a suitable lug 216 is pivoted to vertical arm 212 as at 217, said lug 216 has threadably secured thereto a rod 218 which is threadably secured at its other end to a suitable turnbuckle 219. Threadably mounted in the other end of turnbuckle 219 is rod 220 which is threadably mounted in lug 221, said lug being pivoted to lower portion of arm member 222 as at 223. Arm member 222 is secured at the upper end thereof by any suitable means such as pin or bolt 224 to bearing 40.

Located on this arm 222 is cam follower 225 which is adapted to travel in groove 226 of double acting cam 227 mounted on main drive shaft 39. It is seen that by means of turnbuckle 219 the position of package remover 210 can be adjusted relative to table member 41 in order to give the package the right position when removed from the final position.

Figure 3 shows the package remover disposed to the right, whereas Figure 16 shows the package remover and its associated parts in another position with the package being removed to the left.

A carton 68 when removed to position as shown in Figure 16 will have a tendency to return to its previous position after package remover assumes its position as shown in Figure 3.

Suitable provision must be made in order that package 68 as shown in Figure 16 will maintain the position to the left as shown. In order to accomplish this result suitable gripping dogs 230 and 231 are placed on opposite sides of table 30 to engage the ends of the package or carton 68. These dogs are pivoted on suitable bolts 234 which are attached to table member 30 and said bolts 234 have a torsion spring 232 therearound which normally tends to force gripping dogs back against pins 233. Since the distance from face to face of these dogs is slightly less than the length of a carton, the carton after it has once passed between the dogs will be prevented from returning due to the wedge action that will take place and hold the carton in the position that the package remover has placed it.

Directly above these closed cartons is disposed a broad plate 235 secured in position by any suitable means such as straps 236 which project over this plate and downwardly and are fastened to the top of table member 30. This plate serves as a guide for these packages in order to keep the packages from buckling on the table when a large number of packages are lined up so the glue or adhesive will be dried by the time the cartons make their appearance at the other end of plate 235.

Rotatably mounted in cross members 28 is a shaft 240 which has mounted on one end thereof a sprocket 241 driven by a suitable chain 242 which is also mounted on smaller sprocket 243 which is mounted on main drive shaft 39. Fixedly mounted on shaft 240 are arms 244 and on the ends of arm members 244 are pivoted as at 245 L-shaped members 246. On one end of each of the L-shaped members 246 is mounted a cam roller 247 which is adapted to contact wearing surface of fixed cam 248, said cam 248 being fixed on cross member 28 as at points 249 by any suitable means such as bolts or rivets. It is seen that as shaft 240 rotates in a counter clockwise direction in Figure 3 that cartons 68 are raised to a new level as on table 31 and also turned on their edge.

When the L-shaped member 246 is in a vertical position it immediately fades out and the path traveled by the upright arm of this member will be almost vertical for a short distance, which prevents friction between members 246 and the cartons.

The above described mechanism is in duplicate, one appearing at each side of apron portion 31b except that rods 245 extend from one mechanism to the other but cam 248 controls both mechanisms and therefore members 246 need not be L-shaped at but one end of the structure, as members 246 are fixed on oscillating shafts 245 which are mounted for oscillation in arms 244.

In Figures 20 to 28 inclusive, a modified form of the means for moving the lid portion to closed position is shown. The parts therein which are common to the previous figures have identical reference characters but instead of the closing fingers 118 with the short lip thereon, I provide closing fingers 260 having elongated lips 261 thereon and instead of the curved members 144 as shown in Figures 11 to 13, for example, I provide a plate 262 which has its lower edge secured to the top of angle bar 74 in slightly overlapping relation so that the inside surface of plate 262 coincides with the inside surface of the outer sidewall of carton 68. This plate 262 is secured to angle bar 74 by any suitable means such as splice bars 263 secured to bar 74 and plate 262 by any suitable means such as rivets 264. Plate 262 has five vertically disposed slots 265 therein into which portions 261 of folding fingers 260 move as the carton lid is being closed. Suitable guides 266 are secured in upper ends of these slots 265 which coincide with portions 261 of the folding fingers. Plate 262 has holes 267 and 268 thru which holding fingers 160 are moved, the operation of said fingers having been previously described.

It is seen that portions 261 move thru slots 265, which slots are formed in the lower portion of plate 262 and the vertical leg of guide angle 74. These portions 261 fit in slots 265 in their downward position against the outside surface of the carton, whereas, in the other form shown in Figures 11 and 13, for example, the lip of each of the folding fingers 118 fits down inside the carton.

It is seen that due to the pivot point of folding fingers 260 being removed from the pivot 141 along which the carton lid swings that the portions 261 of the folding fingers will engage the outer lip of the carton lid and move the same downwardly and inwardly as shown in Figure 23 so that by the time the lip of carton lid strikes plate 262 it will continue downwardly into the carton while the portions 261 of folding fingers move thru slots 265. Before the carton lid reaches closing position and before the portions 261 of folding fingers 260 reach lowered position pressure devices 145 move against the sidewall of the carton and force the packages 69 to the position shown in Figures 27 and 28 and move backwardly to inoperative position shown in Figure 28 leaving space 147 for reception of tongue 143 and at the same time, members 145 are removed out of the path of portions 261.

Although the methods of operation of the various elements of the machine have been set forth throughout the description, it might be stated that the rate of travel of conveyer belt 67 is such as to deliver the proper number of cartons per minute onto table 72 and the rate of travel of chain 55 is such, and the spacing of the members 56 thereon are so arranged as to deliver one carton onto table 41 for each revolution of main drive shaft 39.

Let us assume, in operation, that a carton is engaged by one of the lugs 56 on the conveyer chain 55 and is moved along slide 72 until the lug 56 moves downward from against the end of the carton and leaves the rear end of the carton approximately even with the right hand end of crimping bar 110. In other words, the carton is left in stationary position in section A of Figure 1. Then a complete revolution of main drive shaft 39 performs the creasing along line 71a (see Fig. 19) and when the creasing mechanism has returned to inoperative position the next succeeding carton conveyed by the next succeeding lug 56 pushes the first carton into section B of Figure 1 where the first closing operation is consummated and at the same time creasing along line 71a of the second carton is effected. Then the next succeeding carton pushes the two cartons already in the machine and causes the first carton to occupy section C, Figure 1, where the final closing operation is effected and at the same time the second creasing and first closing operation is carried out on the second carton, and the third carton has the initial creasing along line 71a imparted thereto. Next, a fourth carton is forced against the rear end of the third carton and carton number 1 is forced into the path of pusher 210 for lateral movement and the second carton occupies position C, and the third carton occupies position B and the fourth carton occupies position A.

It is thus seen that each carton is stationary while all operations at points A, B and C are performed thereon, and it is to be noted that a plurality of cartons are simultaneously operated upon in a different manner.

I claim:

1. In a machine for moving the lid of a filled carton to closed position, means for intermittently delivering cartons one end against the other to one end of the machine to force the preceding cartons thru the machine by intermittent movements, the pressure of adjacent cartons on the ends of a carton causing its front sidewall to bulge outwardly, means for simultaneously performing a plurality of varied operations on a plurality of cartons to move the lids of the cartons to closed position, and means for moving the contents of the carton to provide a space for the end portion of the lid.

2. In a carton closing machine, means for intermittently moving a line of cartons into the machine, with their ends disposed against each other so one carton will push a preceding carton through the machine, means for creasing the lid portion of one carton, means for moving the lid portion of a second carton to partially closed position, means for moving the contents of the carton to make room for the end portion of the lid, means for moving the lid to complete closed position on a third carton in the line.

3. Carton closing apparatus comprising a conveyor for moving the cartons into the apparatus and causing one carton to move the preceding carton to an advanced position in the machine and to move one sidewall of the carton outwardly to receive the tip of the lid of the carton, means for creasing the lid of the carton while it is in its first position in the machine, means for moving the lid to partially closed position while the carton is in its second position in the machine and means acting on the carton while in its third position in the machine to completely close the lid portion, the first and second means being adapted to operate on succeeding cartons while the third means are operating on the carton, first introduced into the machine, and means for securing the folded lid to the carton.

4. Means for performing a plurality of operations on a filled carton to seal the same, comprising means for bending the upper portion of the ends of the carton inwardly towards each other, means for bending the lid portion at two removed points along lines disposed longitudinally of the lid member thus forming a tongue on the extremity of the lid, means for applying adhesive to the tongue, means for guiding the tongue into the carton when the lid is moved towards closed position and means for moving the contents of the carton away from one of the sidewalls of the carton to form a space for the tongue on the lid when the lid is moved to closed position.

5. Means for performing a plurality of operations on a filled carton to seal the same, comprising means for bending the upper portion of the ends of the carton inwardly towards each other, means for bending the lid portion at two removed points along lines disposed longitudinally of the lid member thus forming a tongue on the extremity of the lid, means for guiding the tongue into the carton when the lid is moved towards closed position, means for holding the lid in partially closed position, means for applying an adhesive to the outer surface of the tongue to cause the carton to remain closed when the lid is moved to complete closed position, means for moving the lid to complete closed position after the adhesive has been applied, a chute through which the filled cartons are moved, means for feeding cartons into the chute end to end so the last introduced carton will push the preceding cartons through the chute and bulge one of the sidewalls of the cartons outwardly for the reception of the tongue with the adhesive thereon.

6. In a carton closing machine for cartons having upwardly projecting flaps on their end portions and having the lid formed integrally with one of its sidewalls, means for intermittently feeding the cartons, end against end, into the machine to cause the cartons to push the preceding cartons through the machine and to bend the front sidewall of the cartons outwardly, means for bending the end flaps to a position parallel to the bottom of the carton, means for creasing and bending the outer portion of the lid to form a tongue, and means for creasing and bending the lid at its junction with the sidewall and at the same time guiding the outer portion of the lid downwardly into contact with the inner face of its other sidewall, and means for moving the contents of the carton away from one sidewall to form a space for the tongue when the lid is moved to closed position.

7. In a carton closing machine for cartons having upwardly projecting flaps on their end portions and having the lid formed integrally with one of its sidewalls, means for bending the end flaps to a position parallel to the bottom of the carton, means for creasing and bending the outer portion of the lid to form a tongue, means for creasing and bending the lid at its junction with the sidewall and at the same time guiding the outer portion of the lid downwardly into contact with the inner face of its other sidewall, means for holding the lid portion in partially closed position, means for applying an adhesive to the tongue while partially inserted in the carton and means for moving the lid to complete closed position after the adhesive has been applied.

8. In a carton closing machine for cartons having upwardly projecting flaps on their end portions and having the lid formed integrally with one of its sidewalls, means for bending the end flaps to a position parallel to the bottom of the carton, means for creasing and bending the outer portion of the lid, means for creasing and bending the lid at its junction with the sidewall, and at the same time guiding the outer portion of the lid downwardly into contact with the inner face of its other sidewall, means for feeding the cartons, end to end through the machine so that a carton will push the preceding cartons through the machine to bulge one of the sidewalls of the cartons outwardly at a point in the travel of the cartons for the reception of the outer portion of the lid, means for holding the lid portion in partially closed position, means for applying an adhesive to the vertically disposed portion of the lid, while in partially closed position, means for moving the lid to complete closed position after the adhesive has been applied and means for applying pressure against the outer sidewalls to complete the sealing operation.

9. In a carton closing machine for cartons having upwardly projecting flaps on their end portions and having the lid formed integrally with one of its sidewalls, means for bending the end flaps to a position parallel to the bottom of the carton, means for creasing and bending the outer portion of the lid to form a tongue, means for creasing and bending the lid at its junction with the sidewall and at the same time guiding the tongue downwardly into contact with the inner face of its other sidewall, means for holding the lid portion in partially closed position, means for applying an adhesive to the vertically disposed portion of the lid while in partially closed position, means for moving the lid to complete closed position after the adhesive has been applied, means for applying pressure against the outer sidewalls to complete the sealing operation and means for moving the sealed cartons laterally in the machine while still maintaining pressure on the sides of the carton until the adhesive has set.

10. In a machine for closing filled cigarette cartons, each of the cartons having flaps integral with its ends and having its lid integral with one of its sidewalls, a driven conveyor, means acting on the carton to crease the outer portion of the lid to form a tongue, means acting on the carton for creasing the lid at its junction point with one of the sidewalls and forcing its tongue into contact with the inner surface of the other sidewall of the container, and means for moving the contents of the carton away from the sidewall to form a space for the tongue when the tongue is moved to closed position.

11. In a machine for closing filled cigarette cartons, each of the cartons having flaps integral with its ends and having its lid integral with one of its sidewalls, a driven conveyor, means acting on the carton while it is moving on the conveyor to fold the flaps on the ends to horizontal position, means acting on the lid portion to crease the outer portion of the lid, means acting on the carton for creasing the lid at its junction point with one of the sidewalls and forcing its outer creased portion into contact with the inner surface of the other sidewall of the container and means for sealing the lid member in closed position.

12. In a machine for closing the lid portion of a carton and sealing the lid portion in closed position, a conveyor for conveying the cartons end to end into the machine, and whereby the cartons will be pushed through the machine by the cartons which are introduced into the machine by said conveyor and whereby one side of the cartons in the machine will be bulged outwardly from the contents of the cartons, said cartons having upwardly projecting tabs on their end portions, and the lid member comprising an extension of one of the side portions of the carton, means for creasing the tabs at the end portions and folding them into a position parallel to the bottom of the carton, means for creasing the outer portion of the lid, means for creasing the lid at the point where it joins the sidewall portion, means for inserting the outer creased portion of the lid against the inside surface of the outwardly bulged front sidewall of the carton, and holding the same in closed position, means for applying an adhesive to the outer surface of the extremity of the lid and means for applying pressure to the sidewalls of the carton to finish the sealing operation.

13. In a machine for folding the lid portion of a carton and sealing the lid portion in closed position, a conveyor for conveying the cartons end to end into the machine, said cartons having upwardly projecting tabs on their end portions, and the lid member comprising an extension of one of the side portions of the carton, means for bending the tabs at the end portion of the cartons and folding them into a position parallel to the bottom of the carton, means for creasing the outer portion of the lid, means for creasing the lid at the point where it joins the sidewall portion, means for inserting the outer creased portion of the lid against the inside surface of the front sidewall of the carton, means for applying an adhesive to the outer surface of the extremity of the lid, means for moving the lid to complete closed position after the adhesive is applied and means for applying pressure to the sidewalls of the carton to finish the sealing operation.

14. In a machine for creasing and moving to closed position the lid portion of a filled carton, said carton having flaps projecting upward from its end portions and having a flap projecting from one side portion to serve as a lid for the carton, a conveyor for moving the cartons end to end into one end of the machine and to intermittently push the preceding cartons thru the machine, means to cause one sidewall of a carton at a point in its travel through the machine to bulge outwardly for successively breaking the flaps extending from the end portions at a line extending along the junction point of the flaps and the end portions of the carton, means for breaking the lid portion along a line near its outer end to form a tongue to occupy a position parallel to one of the side portions of the carton when the lid portion is in closed position, means for breaking the lid along a line where it is joined to the sidewall portion, means for moving the lid portion to partially close the carton, means for applying an adhesive to the outer surface of the tongue on the lid portion, means for completely closing the lid portion and means for applying pressure to the side of the carton to cause the adhesive to bind the tongue on the lid portion to one of the sidewalls of the carton.

15. In a machine for closing cartons comprising a continuously operated conveyor for the cartons, each of said cartons having projecting portions integral with its endwalls and a lid portion integral with one of its sidewalls, means for folding the projections on the endwalls to occupy a plane parallel to the bottom portion of the carton, means for creasing the lid portion at a point to form a tongue for insertion against the inside wall of one side of the carton, means for creasing the lid portion along a line defining the juction point between the lid portion and the sidewall portion, means for guiding the tongue on the lid portion into the inside of the carton, means for applying an adhesive to the outer side of the tongue portion on the lid portion, means for forcing the lid portion to occupy a plane parallel to the bottom portion of the carton, means for applying pressure to the sidewalls of the carton to cause the adhesive to bind the tongue on the lid portion to the inside surface of one of the sidewalls of the carton and means for moving the sealed cartons laterally in the machine after the sealing operation has been completed.

16. Apparatus for folding and sealing the cover portions of cartons provided with upstanding projections on the endwall portions and having the lid portion integral with one of the sidewall portions, comprising a conveyor, means for folding the projecting portions of the endwall portions to occupy a position parallel to the bottom portion of the carton, means for creasing the lid portion in close proximity to its outer edge, means for creasing the lid portion at its point of junction with one sidewall portion, means for inserting the first creased portion of the lid portion partially into the carton, means for applying an adhesive to the portion of the lid partially inserted in the carton, means for completing the closing operation, all of said means except the first mentioned means being operable successively while the carton is in stationary position at intervals between intermittent movements imparted to the cartons to force them thru the apparatus.

17. In a machine for closing filled cartons in which the lid for the carton is integral with one of the sidewalls and is greater in width than the width of the carton so that the outer portion of the lid may be creased to form a tongue to occupy a position immediately within and parallel to the other sidewall when the lid is in closed position, means for intermittently moving the cartons disposed end to end thru the machine, means for creasing the outer portion of the lid, means for creasing the lid at the junction point between the lid and one sidewall of the carton, means for guiding the tongue into the carton while the second crimping operation is being effected and means for moving the contents of the carton away from one sidewall to form a space for the tongue when the lid is moved to closed position.

18. In a machine for closing cartons in which the lid for the carton is integral with one of the sidewalls and is wider than the width of the carton so that the outer portion of the lid may be creased to form a tongue to occupy a position immediately within and parallel to the other sidewall when the lid is in closed position, means for conveying the cartons disposed end to end thru the machine in intermittent movement, means for creasing the outer portion of the lid to form a tongue, means for creasing the lid at the junction point between the lid and one sidewall of the carton, means for guiding the tongue into the carton while the second creasing operation is being effected, means for applying an adhesive to the outer side of the tongue and means for further closing the lid portion to cause the lid to occupy a plane parallel to the bottom of the carton.

19. In a machine for closing cartons in which the lid for the carton is integral with one of the sidewalls and is wider than the width of the carton so that the outer portion of the lid may be creased to form a tongue to occupy a position immediately within and parallel to the other sidewall when the lid is in closed position, means for conveying the cartons disposed end to end thru the machine in intermittent movement, means for creasing the outer portion of the lid to form a tongue, means for creasing the lid at the junction point between the lid and one sidewall of the carton, means for guiding the first tongue into the carton while the second creasing operation is being effected, means for applying an adhesive to the outer side of the tongue, means for further closing the lid portion to cause the lid to occupy a plane parallel to the bottom of the carton, and means for applying pressure to the sidewalls of the carton to cause the adhesive to effectively finish the sealing operation.

20. In a machine for closing cartons in which the lid for the carton is integral with one of the sidewalls and is wider than the width of the carton so that the outer portion of the lid may be creased to occupy a position immediately within and parallel to the other sidewall when the lid is in closed position, means for intermittently conveying the cartons disposed end to end thru the machine, means for creasing the outer portion of the lid to form a tongue, means for creasing the lid at the junction point between the lid and one sidewall of the carton, means for guiding the tongue into the carton while the second creasing operation is being effected, means for applying an adhesive to the outer side of the tongue, means for further closing the lid portion to cause the lid to occupy a plane parallel to the bottom of the carton, means for applying pressure to the sidewalls of the carton to cause the adhesive to effectively finish the sealing operation and means for moving the sealed cartons laterally one after another.

21. In a machine for closing cartons in which the lid for the carton is integral with one of the sidewalls and is wider than the width of the carton so that the outer portion of the lid may be creased to form a tongue to occupy a position immediately within and parallel to the other sidewall when the lid is in closed position, means for conveying the cartons disposed end to end thru the machine in intermittent movement, means for creasing the outer portion of the lid to form a tongue, means for creasing the lid at the junction point between the lid and one sidewall of the carton, means for guiding the tongue into the carton while the second crimping operation is being effected, means for applying an adhesive to the outer side of the tongue, means for further closing the lid portion to cause the lid to occupy a plane parallel to the bottom of the carton, means for applying pressure to the sidewalls of the carton to cause the adhesive to effectively finish the sealing operation and means for moving the sealed cartons laterally one after another, said machine having a chute thru which the sealed cartons are forced laterally so as to give time for the adhesive to set and dry before the cartons emerge from the other end of the chute.

22. In a carton closing machine for closing cartons whose lid is integral with one of the sidewalls and has a tongue thereon for insertion inside the sidewall of the carton, means for applying pressure to the wall of the carton to move the contents of the carton away from the sidewall against which the tongue is to rest when in folded position, means for moving the lid to closed position and means for guiding the tongue into the carton.

23. In a machine for closing filled cartons, simultaneously operated means for performing a plurality of operations on the various cartons to close the same, intermittently operated means for delivering a plurality of cartons to the machine to cause one carton to push the others through the machine, means for crimping the lid of the carton to form a tongue, means for moving the lid to closed position, means for applying an adhesive to the tongue when it is partially moved to closed position, and means for compressing the cartons after the adhesive is applied and the lid is moved to closed position to cause the adhesive to effectively seal the cartons.

24. In a carton closing machine adapted to close cartons whose lid portion is integral with one of its sidewalls, means for moving the contents of the carton away from one sidewall and means operable after the means for moving contents have returned to inoperative position for inserting the end of the lid portion into the space formed by the said movement of said contents.

25. In a carton closing machine adapted to close cartons whose lid is integral with one of its sidewalls and whose lid has a tongue on the free end thereof, movable guiding means for the tongue to bend it inwardly to cause it to be inserted inside the carton, and means operable before the said guiding means are moved for applying pressure to the wall of the carton to move the contents of the carton away from one of its sidewalls to make room for said tongue.

26. A carton folding machine for cartons whose lid is integral with one of the sidewalls of the carton, comprising means for intermittently feeding cartons endwise into the machine to cause the cartons fed into the machine to engage the ends of the preceding cartons and push them through the machine as additional cartons are fed into the machine, a guideway for the cartons, said guideway having a recess in one of its sidewalls into which one of the sidewalls of the carton will extend under pressure from the adjacent cartons to form a slot between the contents of the carton and its sidewall, and means for folding the lid into the carton while its sidewall is extending into said recess.

27. A carton folding machine for cartons whose lid is integral with one of the sidewalls of the cartons, comprising means for intermittently feeding cartons endwise into the machine to cause the cartons fed into the machine to engage the ends of the preceding cartons and push them through the machine as additional cartons are fed into the machine, a guideway for the cartons, said guideway having a recess in one of its sidewalls substantially the length of the carton into which one of the sidewalls of the carton will extend under pressure from the adjacent cartons to form a slot between the contents of the carton and its sidewall, and means for folding the lid into the carton while its sidewall is extending into said recess.

28. A carton folding machine for cartons whose lid is integral with one of the sidewalls of the carton, comprising means for intermittently feeding the cartons endwise into the machine to cause the cartons fed into the machine to engage the ends of the preceding cartons and push them through the machine as additional cartons are fed into the machine, a guideway for the cartons, said guideway having a recess in one of its sidewalls into which one of the sidewalls of the cartons will extend under pressure from adjacent cartons to form a space between the contents of the carton and its sidewall, means for moving the contents of the carton from the sidewall to provide additional space for the reception of said lid portion.

29. A carton folding machine for cartons whose lid is integral with one of the sidewalls of the carton, comprising means for intermittently feeding cartons endwise into the machine to cause the cartons fed into the machine to engage the ends of the preceding cartons and push them through the machine as additional cartons are fed into the machine, a guideway for the cartons, said guideway having a recess in one of its sidewalls into which one of the sidewalls of the carton will extend under pressure from the adjacent cartons to form a slot between the contents of the carton and its sidewall, means for simultaneously performing a plurality of varied operations on a plurality of cartons, one of said operations being that of moving the tip of the lid of a carton into said slot.

30. A carton folding machine for cartons whose lid is integral with one of the sidewalls of the carton, comprising means for intermittently feeding the cartons endwise into the machine to cause the cartons fed into the machine to engage the ends of the preceding cartons and push them through the machine as additional cartons are fed into the machine, a guideway for the cartons, said guideway having a recess in one of its sidewalls into which one of the sidewalls of the carton will extend under pressure from the adjacent cartons to form a space between the contents of the carton and its sidewall, means for moving the contents from one side of the carton to provide additional space for the reception of said lid portion, means for holding the lid in partially closed position and means for rendering adhesive the tip portion of said lid portion while in partially closed position.

31. A carton folding machine for cartons whose lid is integral with one of the sidewalls of the carton, comprising means for intermittently feeding cartons endwise into the machine to cause the cartons fed into the machine to engage the ends of the preceding cartons and push them through the machine as additional cartons are fed into the machine, a guideway for the cartons, said guideway having a recess in one of its sidewalls into which one of the sidewalls of the carton will extend under pressure from the adjacent cartons to form a slot between the contents of the carton and its sidewall, means for folding the lid portion of the carton into said slot and means for securing the lid portion in closed position.

32. A carton folding machine for cartons whose lid is integral with one of the sidewalls of the carton, comprising means for intermittently feeding cartons endwise into the machine to cause the cartons fed into the machine to engage the ends of the preceding cartons and push them through the machine as additional cartons are fed into the machine, a guideway for the cartons, said guideway having a recess in one of its sidewalls into which one of the sidewalls of the carton will extend under pressure from the adjacent cartons to form a slot between the contents of the carton and its sidewall, means for creasing the lid, means for moving the lid of the carton to closed position and means for guiding the outer portion into said slot as it is moved to closed position.

33. A machine for closing cartons whose lid is integral with one of its sidewalls comprising means for moving the lid to closed position, means for applying adhesive to the lid before it is moved to closed position, means for applying pressure to the carton to cause the adhesive to seal the carton, means for receiving the cartons from the sealing machine comprising an elongated chute, and means for moving the cartons through the chute by the insertion of additional cartons to press the cartons closely together in said chute while the adhesive dries under pressure of the cartons pressing against each other.

34. Apparatus for closing cartons having one sidewall extended to form the lid portion, means for moving the cartons intermittently through the apparatus, means for creasing the lid portion at its junction with a sidewall, means for creasing the lid at its outer portion to form a tongue, means for moving the carton to another position than that at which the creasing operation took place, means for moving the lid to partially closed position to insert the tip of the tongue against the inside surface of one of the sidewalls, means for rendering a portion of the outer surface of the tongue adhesive while it is partially inserted into the carton, means for moving the lid to fully closed position after a portion of its outer surface has been rendered adhesive, means for applying pressure to the ends of the carton to cause its sidewall on one side to bulge outwardly to make room for the tongue, and means for applying pressure to the exterior of the sidewall against the interior of which the tongue is disposed to effect a union between the tongue and the sidewall, and means for continuing pressure against said sidewall for an appreciable length of time until the adhesive has set.

GEORGE H. LITTLE.